United States Patent
Su et al.

(10) Patent No.: US 7,466,768 B2
(45) Date of Patent: Dec. 16, 2008

(54) IQ IMBALANCE COMPENSATION

(75) Inventors: Szu-Lin Su, Tainan (TW); Shao-Ping Hung, Taipei (TW); Jeff Lin, Taipei (TW)

(73) Assignee: Via Technologies, Inc., Taipei (TW)

( * ) Notice: Subject to any disclaimer, the term of this patent is extended or adjusted under 35 U.S.C. 154(b) by 669 days.

(21) Appl. No.: 10/867,120

(22) Filed: Jun. 14, 2004

(65) Prior Publication Data

US 2005/0276354 A1 Dec. 15, 2005

(51) Int. Cl.
- H04B 1/66 (2006.01)
- H04L 5/12 (2006.01)
- H04L 7/00 (2006.01)

(52) U.S. Cl. ............... 375/324; 375/262; 375/354; 375/341

(58) Field of Classification Search ...............
375/240.26–240.28, 354–355, 364, 260, 375/296, 326, 324, 262, 344, 327, 337, 140, 375/129, 345, 350, 259, 295, 316, 235; 455/179.1, 455/310, 192.2, 192.1, 318, 182.2, 424, 425, 455/67.11, 164.2, 255, 257, 278.1, 327
See application file for complete search history.

(56) References Cited

U.S. PATENT DOCUMENTS

| 5,249,200 | A * | 9/1993 | Chen et al. .............. 375/285 |
| 5,552,942 | A * | 9/1996 | Ziperovich et al. .......... 360/51 |
| 6,901,122 | B2 * | 5/2005 | Nadgauda et al. .......... 375/347 |
| 7,027,503 | B2 * | 4/2006 | Smee et al. .............. 375/233 |
| 7,035,329 | B2 * | 4/2006 | Jayaraman et al. ......... 375/233 |
| 7,039,001 | B2 * | 5/2006 | Krishnan et al. ........... 370/203 |
| 7,082,174 | B1 * | 7/2006 | Smee et al. .............. 375/349 |
| 7,313,203 | B2 * | 12/2007 | Tubbax et al. ............ 375/316 |
| 2002/0176354 | A1 * | 11/2002 | Chiodini ................. 370/208 |
| 2002/0177427 | A1 * | 11/2002 | Nadgauda et al. .......... 455/403 |
| 2002/0186761 | A1 * | 12/2002 | Corbaton et al. .......... 375/231 |
| 2004/0086055 | A1 * | 5/2004 | Li ..................... 375/260 |
| 2004/0110510 | A1 * | 6/2004 | Jeon et al. ............. 455/450 |
| 2004/0176038 | A1 * | 9/2004 | Luo et al. ............. 455/67.11 |
| 2004/0228399 | A1 * | 11/2004 | Fimoff et al. ............ 375/233 |
| 2004/0240531 | A1 * | 12/2004 | Black et al. ............. 375/148 |
| 2004/0248517 | A1 * | 12/2004 | Reichgott et al. ......... 455/63.4 |
| 2005/0075815 | A1 * | 4/2005 | Webster et al. ........... 702/106 |
| 2007/0147489 | A1 * | 6/2007 | Sun et al. .............. 375/231 |

OTHER PUBLICATIONS

"A Novel IQ Imbalance Compensation Scheme for the Reception of OFDM Signals" Schuchert et al.; Jun. 2001.
"Frequency Offset and I/Q Imbalance Compensation for OFDM Direct-Conversion Receivers" Xing et al.; 2003.

* cited by examiner

*Primary Examiner*—Kevin M Burd
*Assistant Examiner*—Linda Wong
(74) *Attorney, Agent, or Firm*—Thomas, Kayden, Horstemeyer & Risley

(57) ABSTRACT

The present invention discloses a method and apparatus of IQ imbalance compensation for a receiver. The repetitive attribute of the preamble in a signal received by the receiver is used to estimate the IQ imbalance parameters. The data carried by the preamble repeats itself every N sampling intervals. A MSE equation is derived based on assuming the ratios between any two sampling points separated by N samples are identical, and the IQ imbalance parameters can be estimated by solving the MSE equation using the LS algorithm. Consequently, the IQ mismatch offset of the signal is compensated according to the estimated parameters.

18 Claims, 8 Drawing Sheets

IQ IMBALANCE COMPENSATION

BACKGROUND OF THE INVENTION

1. Field of the Invention

The present invention relates to IQ imbalance compensation, and more specifically, to a method and apparatus thereof for estimating and compensating the IQ imbalance at the base band in a receiver.

2. Description of the Related Art

Many wireless devices employ Radio Frequency (RF) direct-conversion as it has inherent advantages in cost, package size, and power consumption. The tradeoff is a higher degree of RF imperfection including In-phase (I) and Quadrature (Q) imbalance induced by the mismatch between the in-phase component and the quadrature component of the received signal. There are already several approaches widely used for IQ imbalance compensation, and two possible solutions are only included herein.

FIG. 1 is a block diagram showing a receiver compensating the IQ imbalance in Orthogonal Frequency Division Multiplex (OFDM) systems by estimating the IQ imbalance using the Least Mean Square (LMS) algorithm. This approach is disclosed in Consumer Electronics, IEEE Transactions, volume 47, issue 3, "A novel IQ imbalance compensation scheme for the reception of OFDM signals" The receiver, proposed by Schuchert A., Hasholzner R., and Antoine P. The receiver first receives the training sequence 11 from the channel, wherein IQ mismatch offset is induced as a result of the imperfection of the receiver. Blocks 111 and 121 model this IQ mismatch offset in the RF band with two parameters, $\alpha$ and $\beta$. The Fast Fourier Transform (FFT) 112 transforms the received signal from time domain to frequency domain, and sends it to an IQ estimator 113 for IQ estimation. Here, the parameters $\alpha$ and $\beta$ 14 of the IQ imbalance are estimated using the LMS algorithm according to a known local reference signal 13. The estimated parameters 14 are then passed to the IQ compensator 122 which compensates the data 12 after considering the effect of the IQ imbalance 121. The output of the IQ compensator 122 is then sent to the FFT 123. The IQ imbalance compensation scheme shown in FIG. 1, however, requires FFT computation as the LMS algorithm is operated in the frequency domain, resulting in significant power consumption and increased cost in the receiver. The performance of the IQ imbalance estimation depends on the accuracy of the sampling time, thus a strict local reference 13 must be provided to the IQ estimator 113. Furthermore, this approach does not consider the channel effect, Carrier Frequency Offset (CFO), and IQ imbalance induced in the transmitter.

FIG. 2 is a block diagram illustrating a receiver for IQ imbalance and frequency offset compensation in OFDM systems according to Acoustics, Speech, and Signal Processing, 2003, Proceedings (ICASSP' 03), 2003 IEEE International Conference on, Volume: 4, Apr. 6-10, 2003 "Frequency offset and I/Q imbalance compensation for OFDM direct-conversion receivers", proposed by Guanbin Xing, Manyuan Shen, and Hui Liu. As shown in FIG. 2, the present scheme models both the CFO 211, 221 and IQ imbalance 212, 222 for the training sequence 21 and data 22 respectively. Upon receiving the training sequence 21, the CFO is estimated using a Non-linear Least Square (NLS) algorithm in block 213, then the IQ imbalance is estimated using a Least Square (LS) algorithm in block 214. Then, the training sequence 21 is passed to block 215 and 216 for FFT computation and equalization (EQ). The estimated CFO parameters are passed to the CFO compensator 224, and similarly, the estimated IQ imbalance parameters are passed to the IQ compensator 223. Therefore the IQ mismatch offset and the CFO in the data received by the receiver can be thoroughly removed. The compensated data is then performed FFT computation and Equalization (EQ) in block 225 and 226 respectively. Herein, the parameters used in the EQ block 226 are derived from the EQ estimator 216. The drawback of this approach is that complicated computations are required for precise CFO estimation. The IQ estimator 214 is unable to provide adequate IQ compensation if the CFO estimator 213 has a poor performance.

SUMMARY OF THE INVENTION

Accordingly, an object of the present invention is to provide a method and apparatus thereof capable of precise parameter estimation for compensating the IQ mismatch offset induced in a receiver.

Another object of the present invention is to provide an IQ imbalance compensation method for a system with unknown Carrier Frequency Offset (CFO) and transmission channel.

A third object of the present invention is to reduce the complexity for estimating the parameters for IQ imbalance compensation in order to maintain low production cost.

An embodiment of the present invention provides an IQ imbalance compensation method and apparatus thereof for a receiver in a communication system. The communication system can be a Wireless Local Area Network (WLAN) system in an embodiment of the present invention.

The IQ imbalance compensation method of the present invention first estimates the IQ imbalance compensation parameters according to a preamble field in a training signal, then compensates a data field in the training signal using the estimated parameters. The sequence in the preamble field repeats itself every N sampling intervals. A ratio between each sampling point of the preamble field with a corresponding sampling point separated by N sampling intervals is calculated, and a Mean Square Error (MSE) equation for the calculated ratios is derived based on the assumption that the calculated ratios are identical. The parameters for IQ imbalance compensation are estimated according to the MSE equation using the Least Square (LS) algorithm. Finally, the IQ imbalance of the data field is compensated according to the estimated parameters. The parameters for IQ imbalance compensation ($\alpha$ and $\beta$) herein denote the effect of IQ mismatch offset induced in the receiver.

After estimating the IQ imbalance compensation parameters, a Carrier Frequency Offset (CFO) is estimated and compensated.

According to IEEE 802.11a specifications, the training signal described in the present invention can be a Physical Layer Convergence Protocol (PLCP) Protocol Data Unit (PPDU) comprising PLCP preamble, PLCP header, PLCP Service Data Unit (PSDU), tail bits, and pad bits. The PLCP preamble comprises a short preamble, and the sequence in the short preamble repeats itself every 16 sampling intervals.

The IQ imbalance compensation apparatus of the present invention comprises a ratio calculator, a MSE calculating unit, a parameter estimator, and a compensator. The ratio calculator calculates the ratio between each sampling point of the preamble field and a corresponding sampling point separated by N sampling intervals, and passed the result to the MSE calculating unit to derive the MSE equation. The parameter estimator computes the IQ imbalance compensation parameters according to the MSE equation using the Least Square (LS) algorithm. The compensator performs IQ imbalance compensation on the data field of the training signal according to the estimated parameters from the parameter estimator.

An embodiment of the present invention also proposes a receiver comprising an antenna, an IQ imbalance estimator, and an IQ imbalance compensator. The IQ imbalance estimator receives the preamble field in the training signal from the antenna and estimates the compensation parameter by solving a Mean Square Error (MSE) equation using the Least Square (LS) algorithm. The IQ imbalance compensator compensates the data field in the training signal according to the compensation parameters estimated by the IQ imbalance estimator.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

First Embodiment

Figure 1:
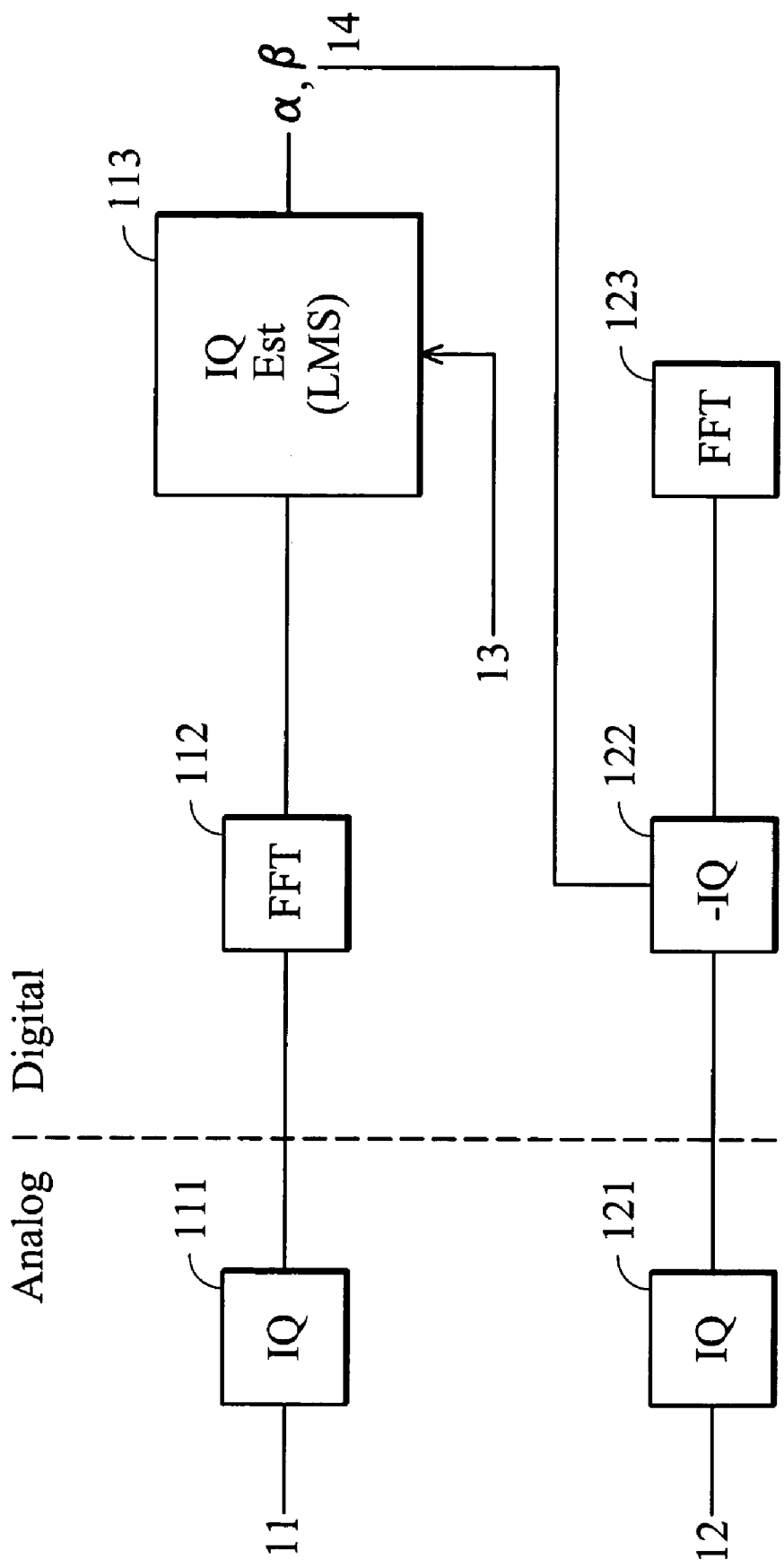
FIG. 1 illustrates an IQ imbalance compensation scheme for an OFDM receiver of the related art.
Figure 2:
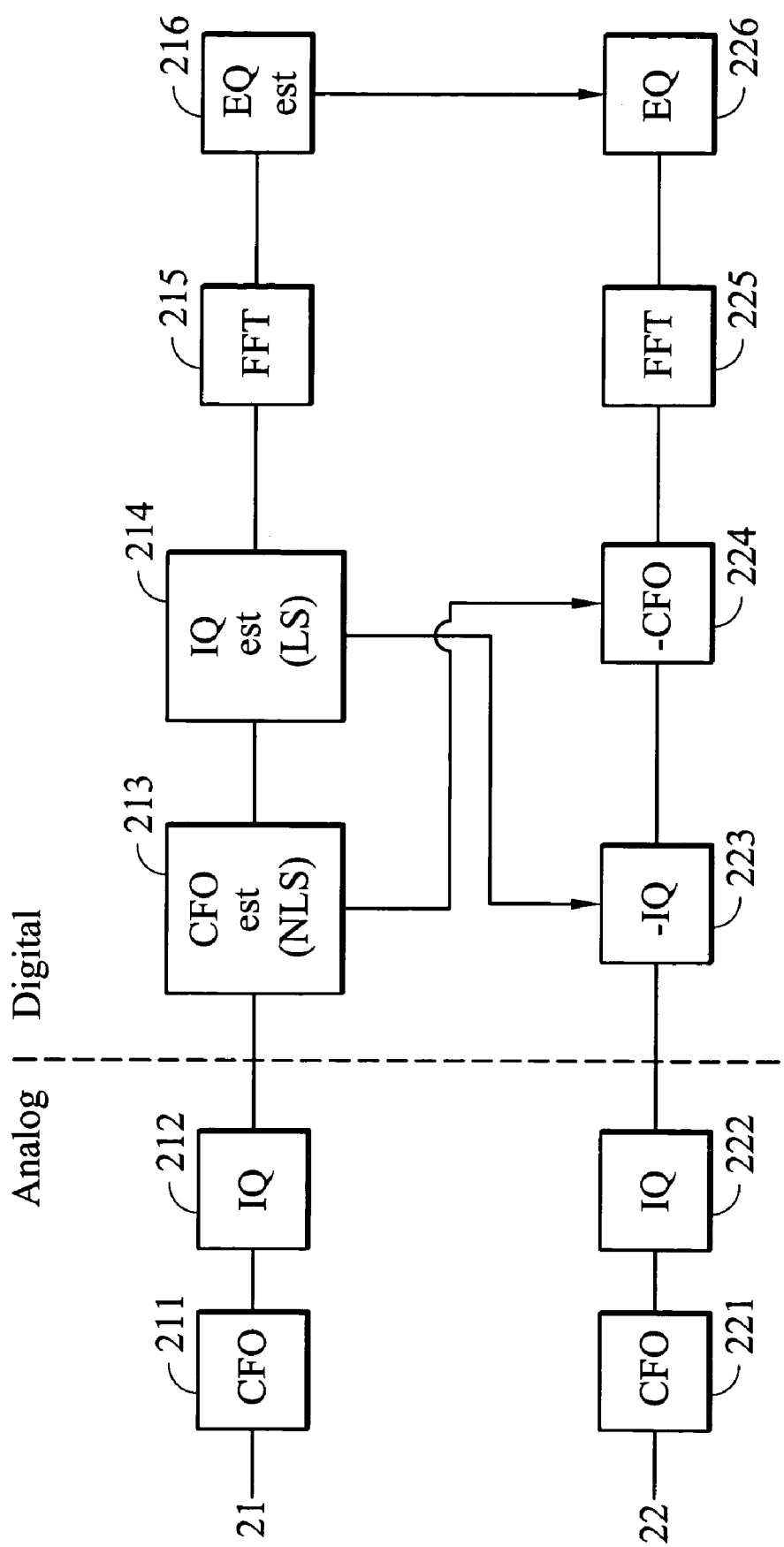
FIG. 2 illustrates a frequency offset and IQ imbalance compensation scheme for an OFDM direct-conversion receiver of the related art.
Figure 3A:
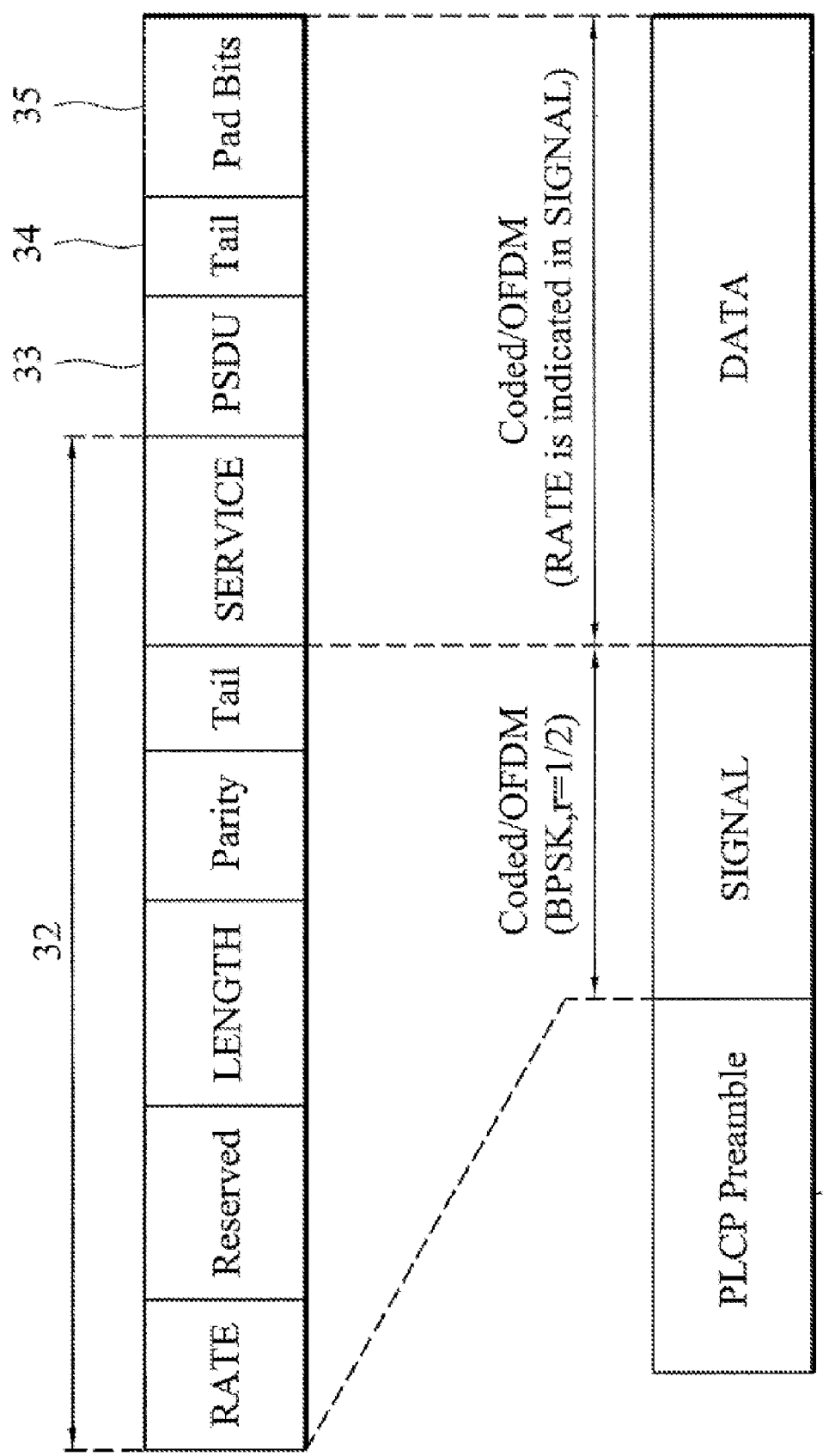
FIG. 3a shows the frame format for a complete PPDU.
Figure 3B:
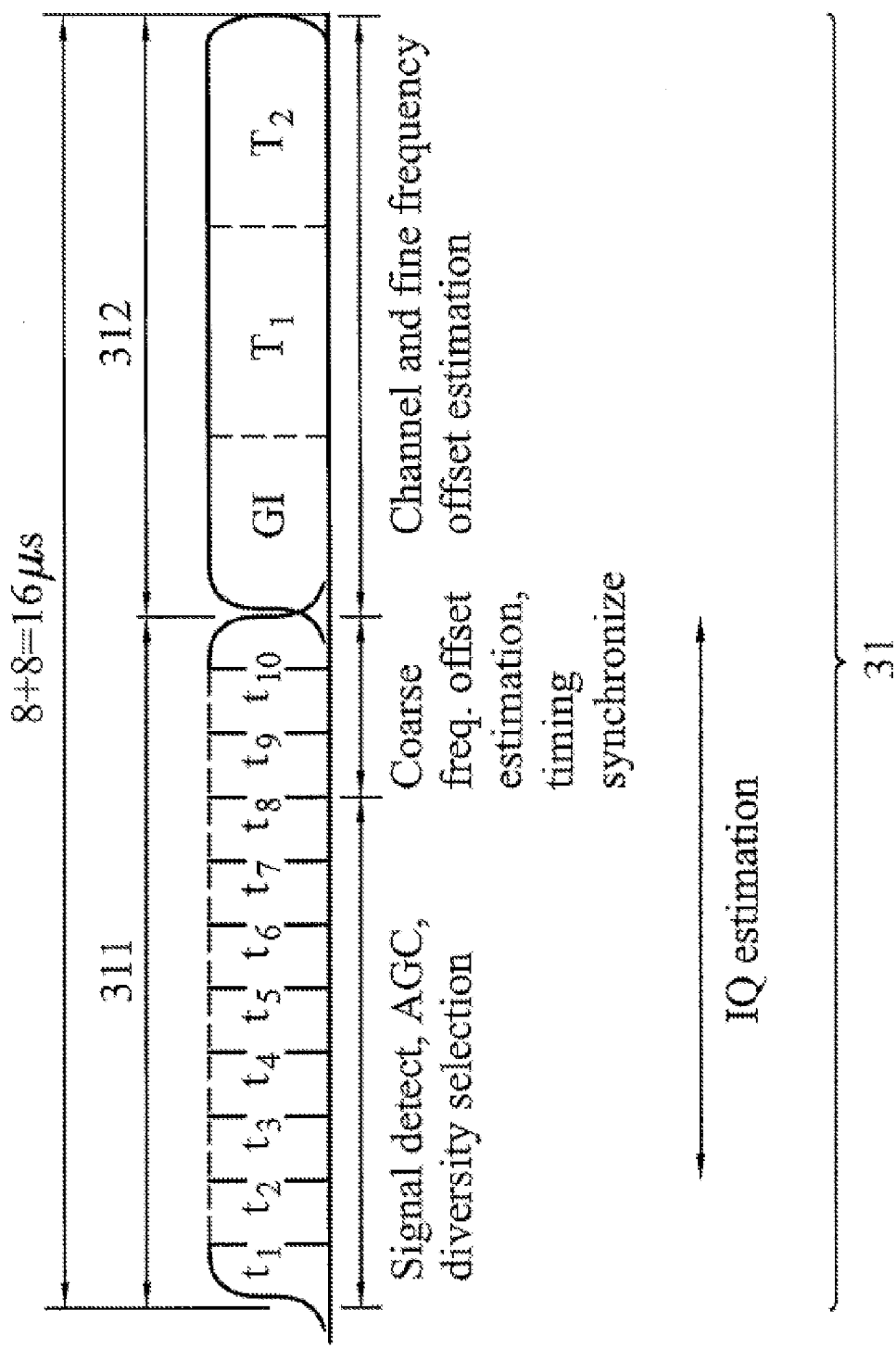
FIG. 3b shows the PLCP preamble in the PPDU.
Figure 5:
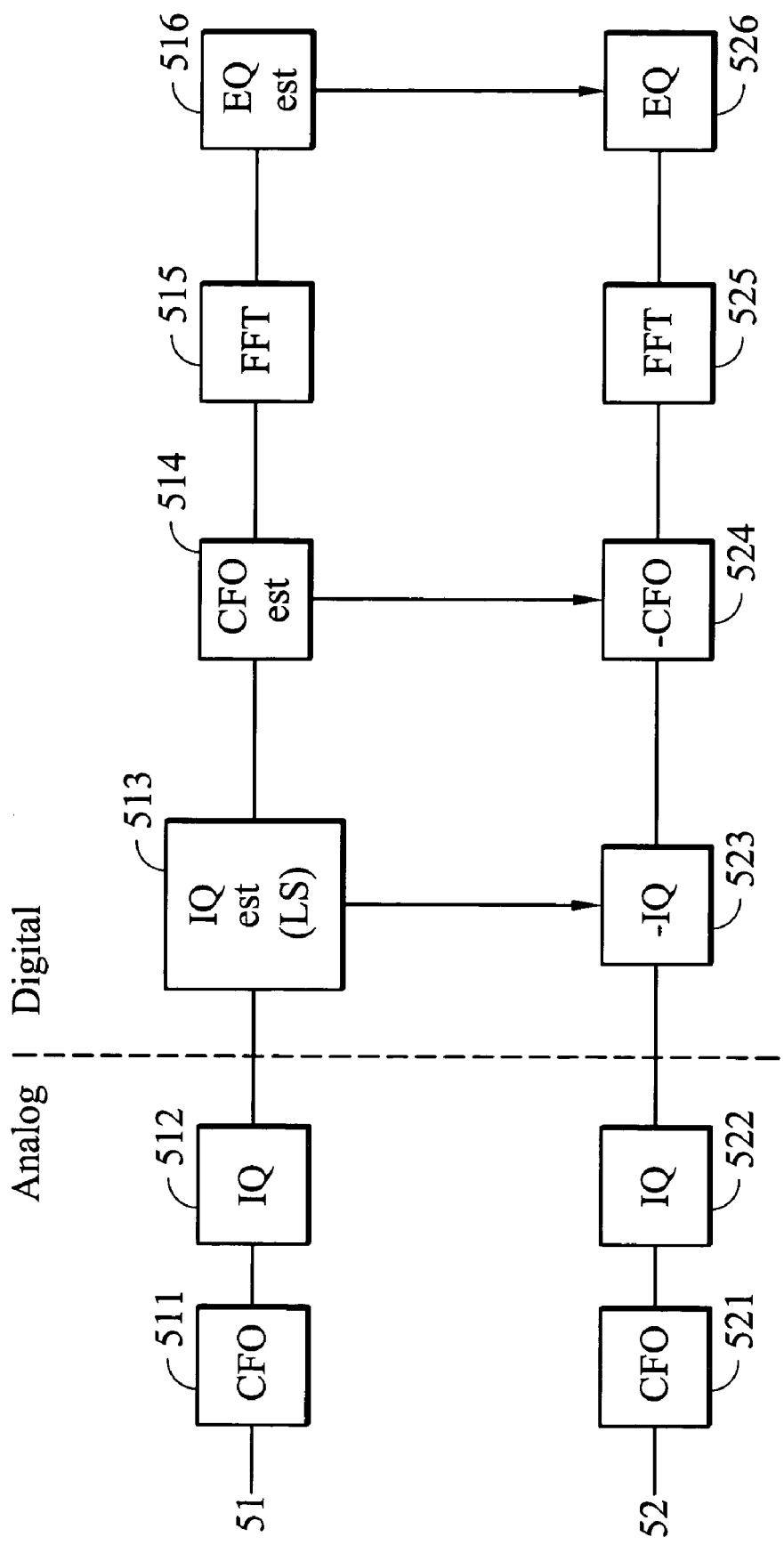
FIG. 5 illustrates the IQ imbalance compensation scheme for a receiver according to an embodiment of the present invention.

The present invention utilizes the repeating symbol (pattern) in a training sequence or called a pilot sequence to estimate the effect of IQ imbalance and CFO (Carrier Frequency Offset). As shown in FIG. 5, a training sequence 51 comprised preambles is typically included in each received training signal for signal detection, synchronization, and equalization in a wireless communication system. FIG. 3a illustrates the frame format of a PLCP Protocol Data Unit (PPDU) in the IEEE 802.11a and IEEE 802.11g specification regulated by the IEEE group. As shown in FIG. 3, the PPDU mainly comprises PLCP (Physical Layer Convergence Protocol) preamble 31, PLCP header 32, PLCP Service Data Unit (PSDU) 33, tail bits 34, and pad bits 35. As shown in FIG. 3b, the PLCP preamble 31 is composed of short preamble 311 and long preamble 312, wherein the short preamble 311 comprises ten repeated "short training sequence" t1~t10, and the long preamble 312 comprises two repeated "long training sequences" and a Guard Interval (GI). The present invention estimates the IQ compensation parameters by extracting the short preamble 311 and solving a MSE equation derived from the repeating characteristic of the short preamble 311. The data pattern of-the short preamble 311 repeats every 16 sampling points in the time domain.

Figure 4:
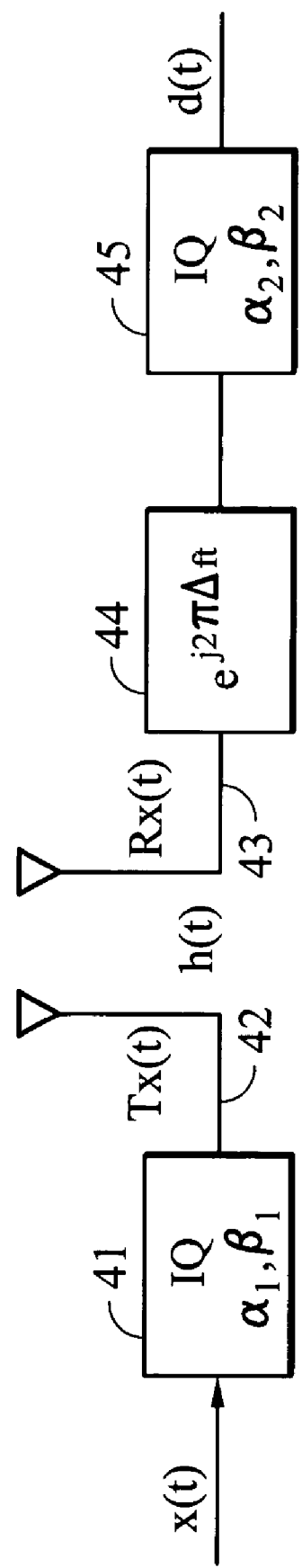
FIG. 4 models the combined effect of IQ imbalance induced in the transmitter and receiver.

The present invention considers the IQ imbalance incurred at the transmitter and the receiver, as well as the Carrier Frequency Offset (CFO) of the receiver. FIG. 4 illustrates the block diagram of a transmitter and a receiver modeling the effect of IQ imbalance and CFO. As shown in FIG. 4, the antenna 42 of the transmitter transmits a signal Tx(t) along the channel with a channel impulse response of h(t). The signal Tx(t) is distorted by the IQ mismatch offset 41 of the transmitter, thus it can be expressed as:

$$Tx(t)=\alpha_1 \cdot x(t)+\beta_1 \cdot x^*(t) \quad \text{Equation (1)}$$

where $\alpha_1$ and $\beta_1$ are the IQ imbalance parameters of the transmitter.

The antenna 43 of the receiver receives a signal Rx(t) from the wireless channel, thus the signal Rx(t) is the convolution of signal Tx(t) and the channel response h(t) as shown in Equation (2).

$$Rx(t)=Tx(t) \otimes h(t) \quad \text{Equation (2)}$$

The receiver has CFO and IQ imbalance effects as modeled by blocks 44 and 45 in FIG. 4, thus the signal d(t) after considering the CFO and IQ imbalance effects becomes:

$$\begin{aligned} d(t) &= \alpha_2 \cdot \{e^{j2\pi\Delta f t} \cdot Rx(t)\} + \beta_2 \cdot \{e^{j2\pi\Delta f t} \cdot Rx(t)\}^* \\ &= \alpha_2 \cdot \{e^{j2\pi\Delta f t} \cdot [(\alpha_1 \cdot x(t) + \beta_1 \cdot x*(t)) \otimes h(t)]\} + \\ &\quad \beta_2 \cdot \{e^{j2\pi\Delta f t} \cdot [(\alpha_1 \cdot x(t) + \beta_1 \cdot x*(t)) \otimes h(t)]\}^* \end{aligned} \quad \text{Equation (3)}$$

wherein $\Delta f$ denotes the Carrier Frequency Offset (CFO), and $\alpha_2$ and $\beta_2$ are the IQ imbalance parameters of the receiver.

The IQ imbalance compensation method provided in the present invention estimates and compensates the IQ mismatch offset before estimating and compensating the CFO. FIG. 5 is a block diagram showing the processing procedures conducted in the receiver according to the present invention. The training sequence 51 (or short preamble of the PPDU) and the data 52 are assumed to be influenced by the CFO 511, 521 and IQ imbalance 512, 522 at the radio frequency (RF) band. The IQ imbalance estimator 513 computes the expected IQ imbalance parameters and passes to the IQ imbalance compensator 523. Subsequently, the CFO is estimated and compensated in the CFO estimator 514 and CFO compensator 524 respectively. The training sequence 51 is transformed by FFT in 515 and equalization estimation in 516. The result of the equalization estimator 516 is fed back to the equalizer 526.

The IQ imbalance estimator 513 computes the compensation parameter by deriving a Mean, Square Error (MSE) equation based on the training sequence (preamble). The MSE equation is then solved using the Least Square (LS) algorithm as described in the following.

According to Equation (3), the conjugate of signal d(t) is:

$$d^*(t)=\alpha_2^* \cdot e^{-j2\pi\Delta f t} \cdot Rx^*(t)+\beta_2^* \cdot e^{j2\pi\Delta f t} \cdot Rx(t) \quad \text{Equation (4)}$$

Equation (6) is derived by combining Equations (3) and (4).

$$e^{j2\pi\Delta f t} \cdot Rx(t) = \frac{\alpha_2^* \cdot d(t) - \beta_2 \cdot d^*(t)}{|\alpha_2|^2 - |\beta_2|^2} \quad \text{Equation (5)}$$

Assuming the sampling interval is $T_s$, and the training sequence in the short preamble repeats every 16 sampling intervals, a ratio between a sampling point t and its corresponding sampling point $(t+16T_s)$ can be expressed by Equation (7).

$$\frac{e^{j2\pi\Delta f(t+16Ts)} \cdot Rx(t+16Ts)}{e^{j2\pi\Delta f t} \cdot Rx(t)} = \frac{\dfrac{\alpha_2^* \cdot d(t+16Ts) - \beta_2 \cdot d^*(t+16Ts)}{|\alpha_2|^2 - |\beta_2|^2}}{\dfrac{\alpha_2^* \cdot d(t) - \beta_2 \cdot d^*(t)}{|\alpha_2|^2 - |\beta_2|^2}} = \frac{\alpha_2^* \cdot d(t+16Ts) - \beta_2 \cdot d^*(t+16Ts)}{\alpha_2^* \cdot d(t) - \beta_2 \cdot d^*(t)} \quad \text{Equation (6)}$$

Due to the repetitive characteristic of the short preamble, the signal sampled at two sampling points with a duration of 16 sampling intervals should be identical if noise and channel variations are not considered. Thus, $Rx(t+16Ts)=Rx(t)$.

$$\frac{e^{j2\pi\Delta f(t+16Ts)} \cdot Rx(t+16Ts)}{e^{j2\pi\Delta f t} \cdot Rx(t)} = \frac{e^{j2\pi\Delta f(t+16Ts)}}{e^{j2\pi\Delta f t}} = e^{j2\pi\Delta f \cdot (16Ts)}$$

Equation (7)

If the length of the short preamble is L, a total of $(L-16-1)$ $e^{j2\pi\Delta f \cdot (16Ts)}|_t$ can be calculated, where the subscript t denotes the short preamble location.

It is further assumed that consecutive ratios calculated in Equation (8) are approximately identical, thus a Mean Square Error (MSE) expressed in Equation (9) is derived.

$$MSE = \sum_{l=1}^{L-16-1} |(e^{j2\pi\Delta f \cdot (16Ts)}|_{t=l+1}) - (e^{j2\pi\Delta f \cdot (16Ts)}|_{t=l})|^2$$

$$= \sum_{l=1}^{L-16-1} \left| \left( \frac{\alpha_2^* \cdot d(t+16Ts) - \beta_2 \cdot d^*(t+16Ts)}{\alpha_2^* \cdot d(t) - \beta_2 \cdot d^*(t)} \right|_{t=l+1} \right) - \left( \frac{\alpha_2^* \cdot d(t+16Ts) - \beta_2 \cdot d^*(t+16Ts)}{\alpha_2^* \cdot d(t) - \beta_2 \cdot d^*(t)} \right|_{t=l} \right) \right|^2$$

Equation (8)

If the phase mismatch $\Delta\phi$ is assumed to be 3 degrees, and the amplitude $\epsilon$ is assumed to be 3 dB, the parameter $\alpha_2$ is approaching 1 (0.9986+0.0089j). The other parameter $\beta_2$ is then solved by first setting the MSE of Equation (8) to zero, and computing using the Least Square (LS) solution as shown in the following.

The two terms in Equation (9) must be equal to zero for $(l=1\sim L-16-1)$ in order to satisfy the MSE equation.

$$\left\| \left( \frac{d(t+16Ts) - \hat{\beta}_2 \cdot d^*(t+16Ts)}{d(t) - \hat{\beta}_2 \cdot d^*(t)} \bigg|_{t=l+1} \right) - \left( \frac{d(t+16Ts) - \hat{\beta}_2 \cdot d^*(t+16Ts)}{d(t) - \hat{\beta}_2 \cdot d^*(t)} \bigg|_{t=l} \right) \right\|^2$$

By simplifying one of the above terms, we can obtain:

The parameter $\hat{\beta}_2$ can be solved by representing in matrix format for $l=1\sim L-16-1$ as shown in Equation (9) and using a LS equation as shown in Equation (10).

$$A \cdot \hat{\beta}_2 = B$$

Equation (9)

$$\left( A = \begin{bmatrix} a_1 \\ a_2 \\ \vdots \\ a_{L-16-1} \end{bmatrix}, B = \begin{bmatrix} b_1 \\ b_2 \\ \vdots \\ b_{L-16-1} \end{bmatrix} \right)$$

$$\hat{\beta}_2 = \frac{A^H \cdot B}{\|A\|^2}$$

Equation (10)

$$= \frac{[a_1^* \ a_2^* \ \cdots \ a_{L-16-1}^*] \cdot \begin{bmatrix} b_1 \\ b_2 \\ \vdots \\ b_{L-16-1} \end{bmatrix}}{\begin{bmatrix} a_1 \\ a_2 \\ \vdots \\ a_{L-16-1} \end{bmatrix} \cdot [a_1^* \ a_2^* \ \cdots \ a_{L-16-1}^*]}$$

$$= \frac{a_1^* \cdot b_1 + a_2^* \cdot b_2 + \cdots + a_{L-16-1}^* \cdot b_{L-16-1}}{|a_1|^2 + |a_2|^2 + \cdots + |a_{L-16-1}|^2}$$

$$= \frac{\sum_{l=1}^{N-16-1} a_l^* \cdot b_l}{\sum_{l=1}^{N-16-1} |a_l|^2}$$

After solving the parameter $\hat{\beta}_2$, the exact value for $\alpha_2$ is estimated according to the following calculation, wherein $\hat{\alpha}_2$ and $\hat{\beta}_2$ are replaced by $\alpha$ and $\beta$.

$$\left( \frac{d(t+16Ts) - \hat{\beta}_2 \cdot d^*(t+16Ts)}{d(t) - \hat{\beta}_2 \cdot d^*(t)} \bigg|_{t=l+1} \right) - \left( \frac{d(t+16Ts) - \beta_2 \cdot d^*(t+16Ts)}{d(t) - \beta_2 \cdot d^*(t)} \bigg|_{t=l} \right) = 0$$

$$\Rightarrow \frac{d(l+1+16Ts) - \hat{\beta}_2 \cdot d^*(l+1+16Ts)}{d(l+1) - \hat{\beta}_2 \cdot d^*(l+1)} = \frac{d(l+16Ts) - \beta_2 \cdot d^*(l+16Ts)}{d(l) - \beta_2 \cdot d^*(l)}$$

$$\Rightarrow a_l \cdot \hat{\beta}_2 = b_l$$

$$\begin{cases} a_l = d(l+16Ts) \cdot d^*(l+1) + d^*(l+16Ts) \cdot d(l+1) - (d^*(l+1+16Ts) \cdot d(l) + d(l+1+16Ts) \cdot d^*(l)) \\ b_l = d(l+16Ts) \cdot d(l+1) - d(l+1+16Ts) \cdot d(l) \\ \hat{\beta}_2^2 \approx 0 \end{cases}$$

$$\begin{cases} \alpha = \cos(\Delta\phi) + j \cdot \varepsilon \cdot \sin(\Delta\phi) \\ \beta = \varepsilon \cdot \cos(\Delta\phi) - j \cdot \sin(\Delta\phi) \end{cases}$$ Equation (11)

$$\Rightarrow \begin{cases} (\text{Real}\{\alpha\})^2 + (\text{Imag}\{\beta\})^2 = 1 \Rightarrow \text{Real}\{\alpha\} = \sqrt{1 - (\text{Imag}\{\beta\})^2} \\ \text{Real}\{\alpha\} \cdot \text{Imag}\{\alpha\} = \cos(\Delta\phi) \cdot \varepsilon \cdot \sin(\Delta\phi) = -\text{Real}\{\beta\} \cdot \text{Imag}\{\beta\} \\ \Rightarrow \text{Imag}\{\alpha\} = -\frac{\text{Real}\{\beta\} \cdot \text{Imag}\{\beta\}}{\text{Real}\{\alpha\}} = -\frac{\text{Real}\{\beta\} \cdot \text{Imag}\{\beta\}}{\sqrt{1 - \text{Imag}\{\beta\}}} \end{cases}$$

$$\Rightarrow \alpha = \text{Real}\{\alpha\} + j \cdot \text{Imag}\{\alpha\}$$
$$= \sqrt{1 - (\text{Imag}\{\beta\})^2} - j \cdot \frac{\text{Real}\{\beta\} \cdot \text{Imag}\{\beta\}}{\sqrt{1 - \text{Imag}\{\beta\}}}$$

Once the two parameters $\hat{\alpha}_2$ and $\hat{\beta}_2$ are obtained, the signal d(t) can be compensated accordingly.

$$d(t) = \alpha_2 \cdot e^{j2\pi\Delta ft} \cdot Rx(t) + \beta_2 \cdot e^{-j2\pi\Delta ft} \cdot Rx^*(t)$$

$$d_{correct}(t) = \frac{\hat{\alpha}_2^* \cdot d(t) - \hat{\beta}_2 \cdot d^*(t)}{|\hat{\alpha}_2|^2 - |\hat{\beta}_2|^2}$$

$$= \frac{\hat{\alpha}_2^* \cdot [\alpha_2 \cdot e^{j2\pi\Delta f} \cdot Rx(t) + \beta_2 \cdot e^{-j2\pi\Delta f} \cdot Rx^*(t)] - \hat{\beta}_2 \cdot [\alpha_2 \cdot e^{j2\pi\Delta f} \cdot Rx(t) + \beta_2 \cdot e^{-j2\pi\Delta f} \cdot Rx^*(t)]^*}{|\hat{\alpha}_2|^2 - |\hat{\beta}_2|^2}$$

assume $\hat{\alpha}_2 = \alpha_2, \hat{\beta}_2 = \beta_2,$ $$d_{correct}(t) = \frac{|\alpha_2|^2 \cdot e^{j2\pi\Delta ft} \cdot Rx(t) + \alpha_2^* \cdot \beta_2 \cdot e^{-j2\pi\Delta f} \cdot Rx^*(t) - \beta_2 \cdot \alpha_2^* \cdot e^{-j2\pi\Delta ft} \cdot Rx^*(t)|\beta_2|^2 \cdot e^{j2\pi\Delta ft} \cdot Rx(t)}{|\hat{\alpha}_2|^2 - |\hat{\beta}_2|^2}$$

$$= \frac{|\alpha_2|^2 \cdot e^{j2\pi\Delta ft} \cdot Rx(t) - |\beta_2|^2 \cdot e^{j2\pi\Delta ft} \cdot Rx(t)}{|\hat{\alpha}_2|^2 - |\hat{\beta}_2|^2}$$

$$= e^{j2\pi\Delta ft} \cdot Rx(t)$$

An embodiment of the present invention provides a superior IQ imbalance compensation method since it reduces the computational complexity, considers the CFO effect, and is not influenced by the IQ imbalance induced at the transmitter. The LS algorithm used in the present invention is a much simpler alternative to the FFT and Nonlinear Least Square (NLS) algorithms employed for IQ imbalance compensation in the related art. The IQ imbalance compensation method proposed in the present invention considers the IQ imbalance induced in the transmitter since it uses the reference signal transmitted by the transmitter instead of a local reference signal generated in the receiver. Therefore, the IQ imbalance compensation method proposed in the present invention is still adequate for compensating the signal with the IQ imbalance effect induced in the transmitter. Furthermore, the sampling timing is not a crucial criterion for IQ imbalance estimation since the receiver is capable of performing the IQ imbalance compensation of the present invention after detecting the repetitive preamble. The present invention however assumes that the CFO of the receiver is not equal to or approaching zero, so that the ratio between any two sampling points will not be too small.

Second Embodiment

In a real implementation, the longer the sampling interval between two repeated sampling points, the better the IQ imbalance compensation performance. Extending the sampling interval between two repeated sampling points improves the compensation performance when the CFO is relatively small. An example of changing the sampling interval from $16T_s$ to $32T_s$ is shown in Equation (12).

$$\frac{e^{j2\pi\Delta f(t+32Ts)} \cdot Rx(t + 32Ts)}{e^{j2\pi\Delta ft} \cdot Rx(t)} = e^{j2\pi\Delta f \cdot 32Ts}$$ Equation (12)

It is also recommended that several sampling points be averaged before computing the ratio in order to diminish the effect of noise. An example of averaging two sampling points is shown in Equation (13).

$$\frac{e^{j2\pi\Delta f(t+32Ts)} \cdot Rx(t + 32Ts) +}{e^{j2\pi\Delta ft} \cdot Rx(t) + e^{j2\pi\Delta f(t+16Ts)} \cdot Rx(t + 16Ts)} =$$

$$\frac{e^{j2\pi\Delta f(t+32Ts)} \cdot [Rx(t + 32Ts) + e^{j2\pi\Delta f \cdot 16Ts} \cdot Rx(t + 48Ts)]}{e^{j2\pi\Delta ft} \cdot [Rx(t) + e^{j2\pi\Delta f \cdot 16Ts} \cdot Rx(t + 16Ts)]} = e^{j2\pi\Delta f \cdot 32Ts}$$ Equation (13)

Another method of reducing error caused by noise is setting a threshold for determining the validity of each sample. After changing the sampling interval as shown in Equation (13), the MSE equation of Equation (9) becomes:

$$MSE = \sum_{t=1}^{L-16-1} \left| \left( \frac{d(t+32Ts) - \hat{\hat{\beta}}_2 \cdot d^*(t+32Ts)}{d(t) - \hat{\hat{\beta}}_2 \cdot d^*(t)} \bigg|_{t=l+1} \right) - \left( \frac{d(t+32Ts) - \beta_2 \cdot d^*(t+32Ts)}{d(t) - \beta_2 \cdot d^*(t)} \bigg|_{t=l} \right) \right|^2$$

$$= 0$$

Equation (14)

Some samples of the signal are expected to have greater distortion than other samples, thus a threshold is set to examine whether the current sample should be considered in the IQ imbalance estimation.

$$MSE = \sum_{t=1}^{L-16-1} \left| \left( \frac{d(t+32Ts) - \hat{\hat{\beta}}_2 \cdot d^*(t+32Ts)}{d(t) - \hat{\hat{\beta}}_2 \cdot d^*(t)} \bigg|_{t=l+1} \right) - \right.$$

-continued $$\left(\left.\frac{d(t+32Ts)-\beta_2 \cdot d^*(t+32Ts)}{d(t)-\beta_2 \cdot d^*(t)}\right|_{t=l}\right)\right\}\right|_{G(m)<th}\Bigg|^2$$

where $$G(m) = \left\{\left(\left.\frac{d(t+32Ts)-\hat{\hat{\beta}}_2 \cdot d^*(t+32Ts)}{d(t)-\hat{\hat{\beta}}_2 \cdot d^*(t)}\right|_{t=l+1}\right) - \left(\left.\frac{d(t+32Ts)-\beta_2 \cdot d^*(t+32Ts)}{d(t)-\beta_2 \cdot d^*(t)}\right|_{t=l}\right)\right\}$$

An embodiment of the present invention considers and compensates the angular or frequency error induced from noises and interferences. A maximum angular error or a maximum frequency error is set as a tolerable value for IQ mismatch. In an embodiment, the maximum angular error for IQ mismatch specified in the datasheet is ±3°, if the phase mismatch is larger than 3 degrees due to strong noises or $\Delta\phi$ effect, it is clipped as the maximum angular error ±3° before performing IQ imbalance compensation.

Figure 6:
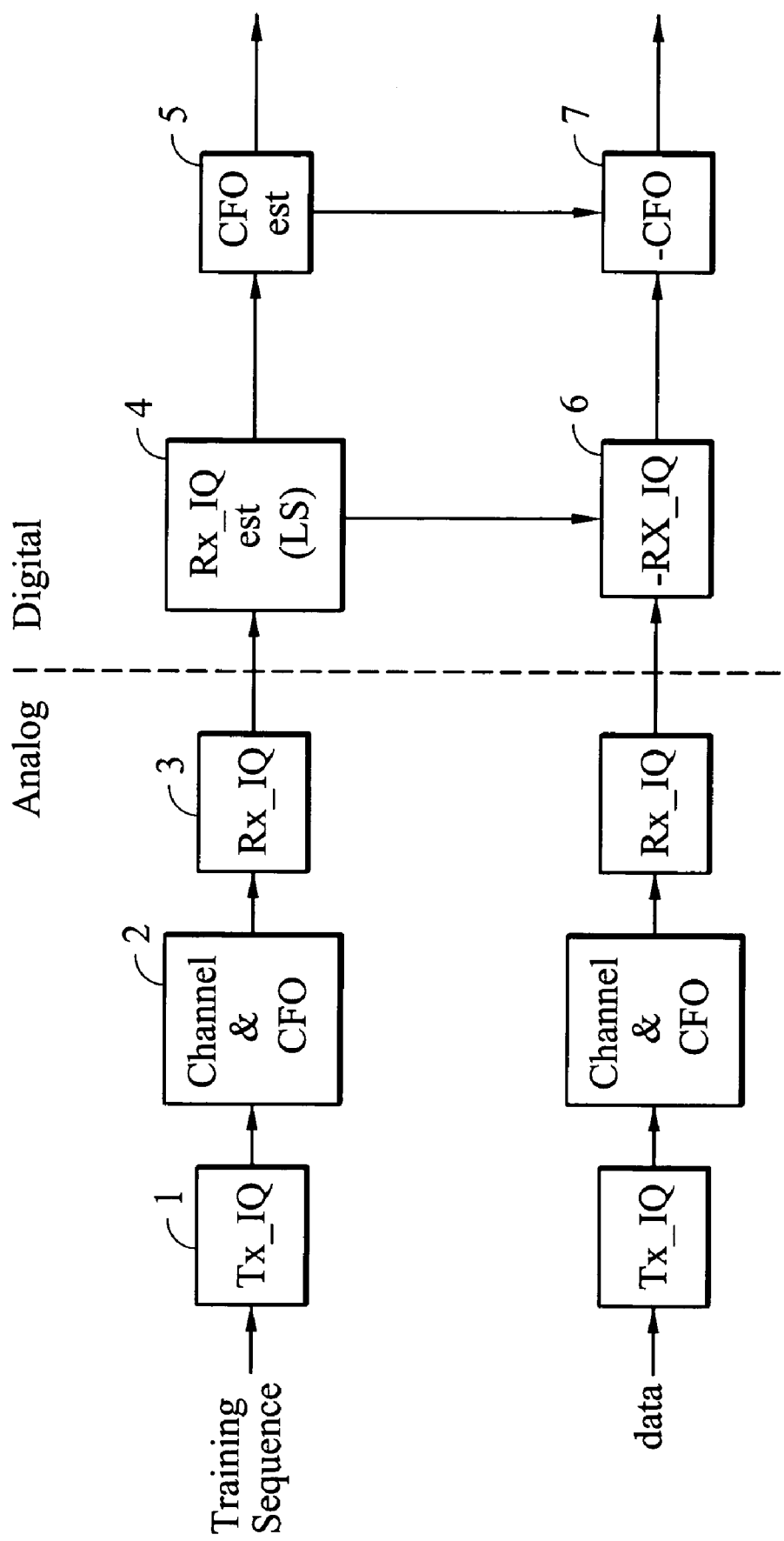
FIG. 6 illustrates a detailed flow diagram for a receiver according to the IQ imbalance compensation scheme of FIG. 5.

FIG. 6 illustrates the IQ estimation and CFO estimation process according to FIG. 5 of the present invention. The IQ imbalance estimation can be accomplished in time domain. As shown in FIG. 6, a training sequence is transmitted from a transmitter to a receiver via a channel. During the transmission described above, IQ imbalance is induced in both the transmitter (step 1) and receiver (step 3), and Carrier Frequency Offset (CFO) is induced in the channel (step 2). In the receiver's end, the training sequence is converted to digital data and the IQ mismatch of the receiver is estimated using the LS algorithm in step 4. The IQ estimation is then fed to perform IQ mismatch compensation for the data in step 6. Similarly, the CFO estimated in step 5 is used for compensating CFO in step 7.

Figure 7:
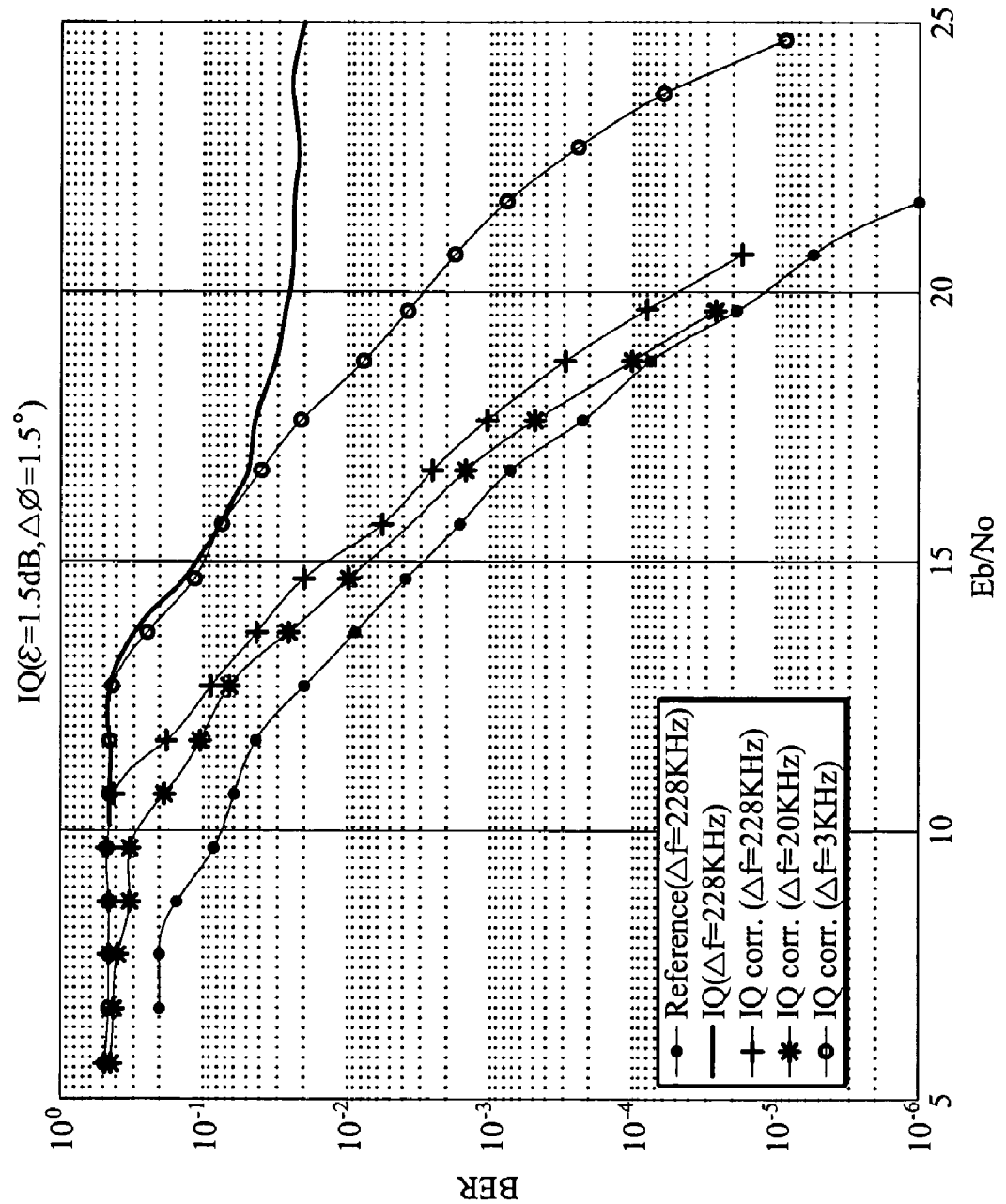
FIG. 7 illustrates a simulation result of IQ imbalance ($\Delta\phi=1.5°$, $\epsilon=1.5$ dB) and correction for a receiver according to an embodiment of the present invention.

FIG. 7 illustrates a simulation result of the IQ imbalance compensation technique ($\Delta\phi=1.5°, \epsilon=1.5$ dB) according to an embodiment of the present invention. The simulation takes IEEE 802.11a as an example, wherein a short preamble contains 10 repeat symbols, each with 16 sampling time intervals. The data rate is chosen to be 54 Mbits/s. A two-ray multi-path is used in the simulations and the IQ imbalanced is clipped to $\Delta\phi=\pm3°$ and $\epsilon=\pm3$ dB if the estimated offset is over or under $\Delta\phi=\pm3°$ and $\epsilon=\pm3$ dB. As shown in FIG. 7, the proposed IQ imbalance compensation technique improves the performance, but it also shows that the proposed technique is sensitive to carrier frequency offset, especially at small frequency $\Delta f$.

The embodiments described above are applicable to all kinds of training sequences embeds a preamble (i.e. a field contained predetermined repeating data) therein, for example, signals comprising either short preamble or long preamble defined by IEEE 802.11 a/g, and signal comprising a preamble defined by IEEE 802.11b.

The IQ imbalance estimation and compensation technique proposed in the present invention is however not limited to be implemented in the OFDM system, other telecommunication systems, even the one without FFT, can also perform the proposed IQ imbalance estimation and compensation in time domain.

Finally, while the invention has been described by way of example and in terms of the above, it is to be understood that the invention is not limited to the disclosed embodiment. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for estimating IQ imbalance introduced on a receiver in a communication system, comprising the following steps:
   receiving a plurality of training signals comprising a preamble field with repeat training symbols during a frame time interval with N sampling intervals;
   calculating a ratio between each sampling point of the preamble field and a corresponding sampling point separated by N sampling intervals;
   deriving a Mean Square Error (MSE) equation for the calculated ratios assuming the calculated ratios are identical; and
   estimating parameters for IQ imbalance compensation according to the equation; wherein:
   the MSE equation is derived based on length of the preamble field and the N sampling intervals, defined as:

$$MSE = \sum_{l=1}^{L-x-1} \left|(e^{j2\pi f \cdot (xTs)}|_{t=l+1}) - (e^{j2\pi\Delta f \cdot (xTs)}|_{t=1})\right|^2$$

where L is a length of the preamble field, Ts is a sampling interval; and x is a number of sampling intervals between two repeated samples.

2. The IQ imbalance estimation method according to claim 1, further comprising compensating the IQ imbalance of the received signal according to the estimated parameters.

3. The IQ imbalance estimation method according to claim 1, further comprising estimating a Carrier Frequency Offset (CFO) for CFO compensation after estimating the parameters for IQ imbalance compensation.

4. The IQ imbalance estimation method according to claim 1, wherein the parameters for IQ imbalance compensation ($\alpha$ and $\beta$) denote the effect of IQ mismatch offset induced in the receiver.

5. The IQ imbalance estimation method according to claim 1, wherein the receiver is operated in a Wireless Local Area Network (WLAN) system.

6. The IQ imbalance estimation method according to claim 1, further comprising averaging at least two sampling points to replace each sampling point when calculating the ratios for deriving the MSE equation.

7. The IQ imbalance estimation method according to claim 1, further comprising setting a threshold for determining the validity of each sampling point to disregard sampling points with intolerable noise distortion.

8. The IQ imbalance estimation method according to claim 1, wherein the training signal is a Physical Layer Convergence Protocol (PLCP) Protocol Data Unit (PPDU) comprising PLCP preamble, PLCP header, PLCP Service Data Unit (PSDU), tail bits, and pad bits.

9. The IQ imbalance estimation method according to claim 8, wherein the PLCP preamble comprises a short preamble and the sequence in the short preamble repeats itself every 16 sampling intervals.

10. The IQ imbalance estimation method according to claim 1, wherein the parameters for IQ imbalance compensation is estimated using the Least Square (LS) algorithm.

11. An IQ imbalance compensation apparatus for IQ imbalance compensation, receiving a training signal comprising a preamble field and a data field, wherein a sequence in the preamble field repeats itself every N sampling intervals, the apparatus comprising:

a ratio calculator, calculating a ratio between each sampling point of the preamble field and a corresponding sampling point with N sampling intervals apart;

a calculating unit, coupled to the ratio calculator for deriving a MSE equation for the calculated ratio assuming the calculated ratios are identical;

a parameter estimator, coupled to the calculating unit for estimating parameters for IQ imbalance compensation according to the equation; and a compensator, receiving the estimated parameters from the parameter estimator for compensating the IQ imbalance of the data field; wherein:

the MSE equation is derived based on length of the preamble field and the N sampling intervals, defined as:

$$MSE = \sum_{l=1}^{L-x-1} |(e^{j2\pi f \cdot (xTs)}|_{t=l+1}) - (e^{j2\pi \Delta f \cdot (xTs)}|_{t=1})|^2$$

where L is a length of the preamble field, Ts is a sampling interval, and x is a number of sampling intervals between two repeated samples.

12. The IQ imbalance compensation apparatus according to claim 11, wherein the parameters for IQ imbalance compensation ($\alpha$ and $\beta$) denote the effect of IQ mismatch offset induced in the receiver.

13. The IQ imbalance compensation apparatus according to claim 11, wherein the parameter estimator estimates the parameters for IQ imbalance compensation using the Least Square (LS) algorithm.

14. A receiver for IQ imbalance compensation, comprising:

an antenna, receiving a training signal comprising a preamble field and a data field, wherein a sequence in the preamble field repeats itself every N sampling intervals;

an IQ imbalance estimator, receiving the preamble field of the training signal from the antenna, and comprising:

a ratio calculator, calculating a ratio between each sampling point of the preamble field and a corresponding sampling point separated by N sampling intervals;

a calculating unit, coupled to the ratio calculator for deriving a MSE equation for the calculated ratio assuming the calculated ratios are identical; and a parameter estimator, coupled to the calculating unit for estimating parameters for IQ imbalance compensation according to the MSE equation; and an IQ imbalance compensator, coupled to the antenna and the IQ estimator for receiving the estimated parameters from the parameter estimator to compensate the IQ imbalance of the data field; wherein the MSE equation is derived based on length of the preamble field and the N sampling intervals, defined as:

$$MSE = \sum_{l=1}^{L-x-1} |(e^{j2\pi f \cdot (xTs)}|_{t=l+1}) - (e^{j2\pi \Delta f \cdot (xTs)}|_{t=1})|^2$$

where L is a length of the preamble field, Ts is a sampling interval, and x is a number of sampling intervals between two repeated samples.

15. The receiver according to claim 14, further comprising:

a Carrier Frequency offset (CFO) estimator, coupled to the IQ imbalance estimator for estimating a Carrier Frequency Offset (CFO);

a CFO compensator, coupled to the IQ imbalance compensator and the CFO estimator for compensating the CFO of the data field received from the IQ imbalance compensator according to the output of the CFO estimator.

16. The receiver according to claim 14, wherein the parameters for IQ imbalance compensation ($\alpha$ and $\beta$) denote the effect of IQ mismatch offset induced in the receiver.

17. The receiver according to claim 14 is operated in a Wireless Local Area Network (WLAN) system.

18. The receiver according to claim 14, wherein the parameter estimator estimates the parameters for IQ imbalance compensation using the Least Square (LS) algorithm.

* * * * *